Figure 1:
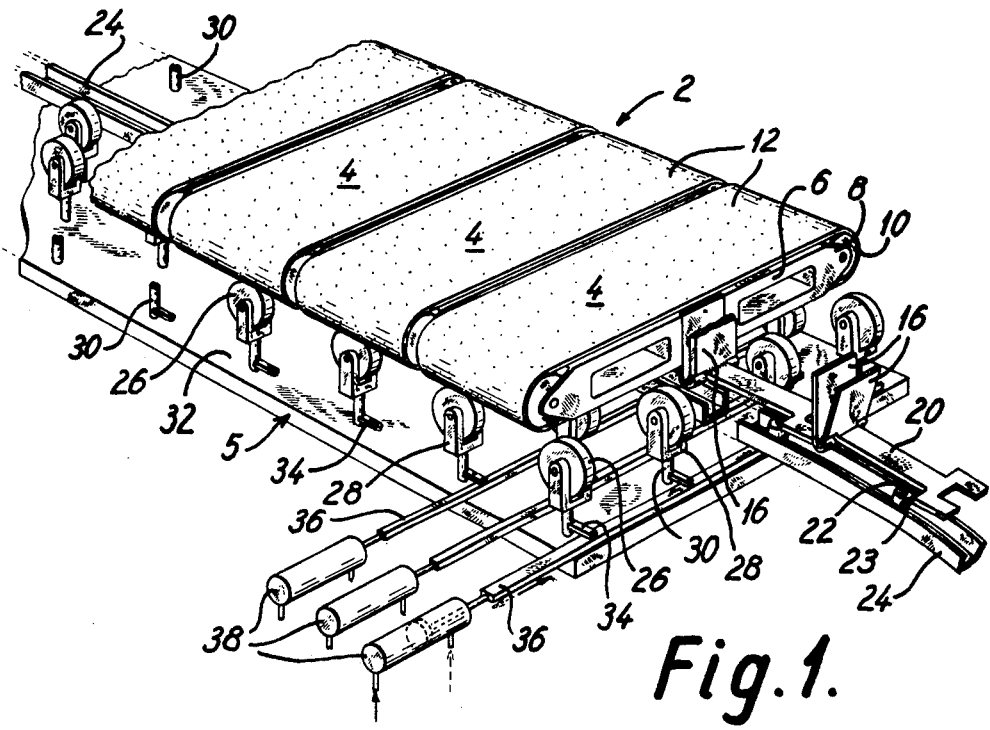

United States Patent [19]

Nielsen

[11] 4,096,936
[45] Jun. 27, 1978

[54] SELECTIVELY CONTROLLABLE UNLOADING ARRANGEMENT FOR SORTING CONVEYOR CONSTRUCTIONS

[75] Inventor: Jacob August Nielsen, Vibly J., Denmark

[73] Assignee: Kosan Crisplant A/S, Denmark

[21] Appl. No.: 605,814

[22] Filed: Aug. 19, 1975

Related U.S. Application Data

[63] Continuation of Ser. No. 270,030, Jul. 10, 1972, abandoned, which is a continuation of Ser. No. 86,250, Nov. 3, 1970, abandoned.

[30] Foreign Application Priority Data

Nov. 3, 1969 United Kingdom ............... 53783/69
Nov. 19, 1969 United Kingdom ............... 56596/69

[51] Int. Cl.$^2$ ............................................. B65G 43/00
[52] U.S. Cl. .................................... 198/356; 198/365
[58] Field of Search ................. 198/38, 36, 185, 350, 198/355, 365, 356; 214/11 R, 11 C

[56] References Cited

U.S. PATENT DOCUMENTS 2,613,790  10/1952  Schottelkotte ........................ 198/36
3,144,926  8/1964   Edelman ................................ 198/38
3,147,845  9/1964   Harrison et al. ...................... 198/38
3,231,068  1/1966   Harrison et al. ..................... 198/185

Primary Examiner—Evon C. Blunk
Assistant Examiner—Douglas D. Watts
Attorney, Agent, or Firm—Craig & Antonelli

[57] ABSTRACT

A conveyor such as especially a sorting conveyor having an endless conveyor belt structure comprising a plurality of juxtaposed belt links each constituted by a conveyor element provided with an endless conveyor belt mounted crosswise so as to have an exposed upper run constituting part of the article supporting surface of said conveyor belt structure, means being provided for driving any selected cross conveyor belt in order to effect diversion of an article from said conveyor belt structure at a selected place therealong said driving means such as driving rollers being arranged substantially stationarily at least relatively to said conveyor elements so as to be able to drive the cross conveyor belts without participating in the movement thereof, actuator means being provided for making said driving means operative in response to an article approaching the place in which it is wanted to be diverted from the conveyor.

18 Claims, 5 Drawing Figures

SELECTIVELY CONTROLLABLE UNLOADING ARRANGEMENT FOR SORTING CONVEYOR CONSTRUCTIONS

This is a continuation of U.S. Application Ser. No. 270,030 filed July 10, 1972, now abandoned which in turn was a continuation of U.S. Application Ser. No. 86,250, filed Nov. 3, 1970, now abandoned.

The present invention relates to a conveyor such as a sorting conveyor having an endless conveyor belt structure comprising a plurality of juxtaposed belt links each constituted by a crosswise arranged conveyor unit having means for laterally displacing the upper article carrier surface portions thereof, one or more receiving stations being provided for causing actuation of a selected conveyor unit when this unit passes the receiving station in which an article carried thereon is to be discharged.

There are several manners in which articles carried on a sorting conveyor may be transversely removed or diverted from the conveyor in order to be automatically delivered to a selected receiving station along the conveyor, for example in connection with the sorting of post parcels, flight luggage etc. Thus it is known to actuate a scraper member for pushing the articles sideways off the conveyor or to tilt the particular section of the conveyor so as to cause the article to slide off therefrom by the action of the gravity. It has also been suggested to provide the belt links with a round going cross belt structure to the lower run of which there is secured a downwardly protruding pin which, when moving into engagement with an inclined guiding rail constituting the said actuator means will be forced to move laterally as the belt link is advanced along the conveyor chassis, whereby its movement is transferred to the upper run of the cross belt structure, so that an article resting thereon will be moved sideways off the conveyor. However, it is necessary to thereafter cause the said pin to return to its initial position, and besides it is complicated to carry out the arrangement in such a manner that the article may be moved off selectively to either side of the conveyor. Furthermore, in order to obtain a safe operation of the system the actuator means should be controlled very accurately, so as to operate the guiding rail means between the passages of two consecutive pins.

It is an object of the present invention to provide a conveyor in which the diversion of the articles may be effected in a simple and safe manner without the necessity of operating the said actuator means is extremely exact relation to the momentary positions of the single links of the conveyor structure.

A further object of the invention is to provide a conveyor of the said type in which it is not necessary to make provisions for returning the cross conveyor belts to their initial position after each article delivery therefrom.

Still a further object of the invention is to provide a conveyor in which an article diversion selectively to either side of the conveyor is obtained by simple means. A more specific object of the invention is to provide a conveyor of the type referred to in which the said belt structure links or elements are constituted by crosswise orientated belt conveyors, each having an endless conveyor belt, whereas the said lateral displacement means are constituted by an endless movable driving means such as a wheel or a roller which is mounted substantially stationary relatively to the conveyor or the conveyor unit, and is adapted to drive the cross conveyor belt by a driving engagement with this belt or with the guiding means thereof, the said actuation means being adapted to induce a driving movement of the said driving means.

It will be appreciated that with this arrangement it is sufficient to maintain the actuator means operative as long a time as required for effecting the diversion movement, whereafter the cross conveyor belt may be left in its stop position, in which it is ready to be started for effecting another diversion after renewed loading thereof. Thus, the cross belts themselves may be constituted by smooth or unbroken belts offering a good carrier surface for the articles, and they are equally easily moved to both sides of the main conveyor without first having been returned to any particular initial position.

Figure 2:
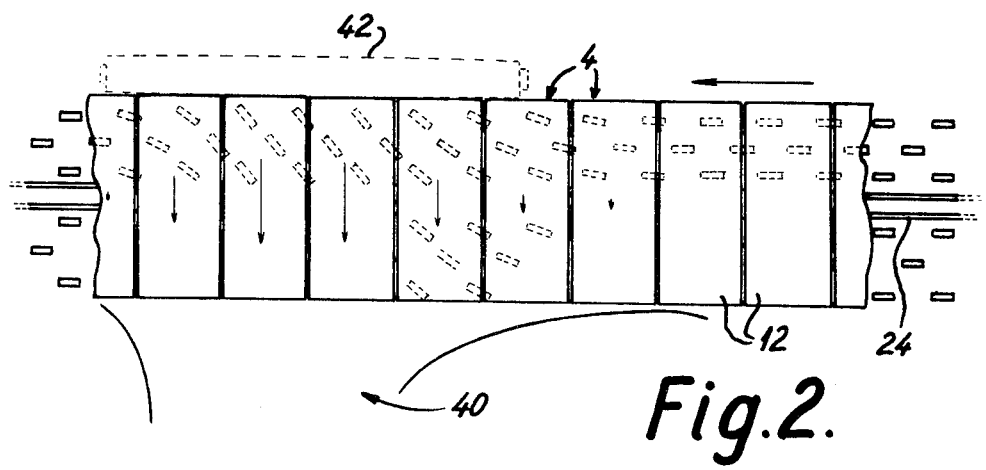
Figure 3:
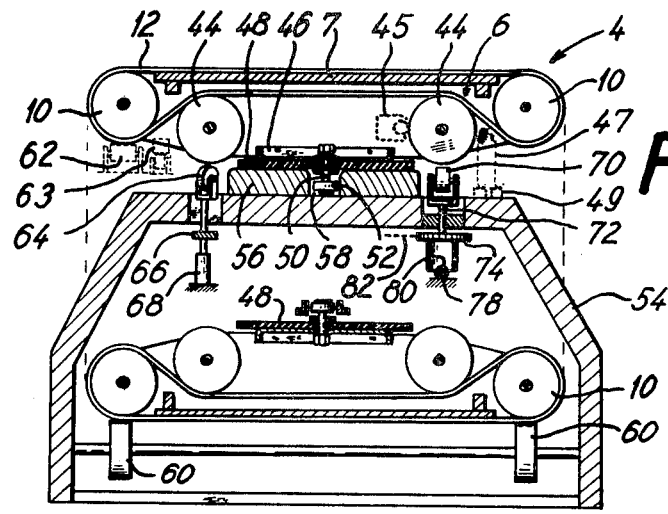
Figure 4:
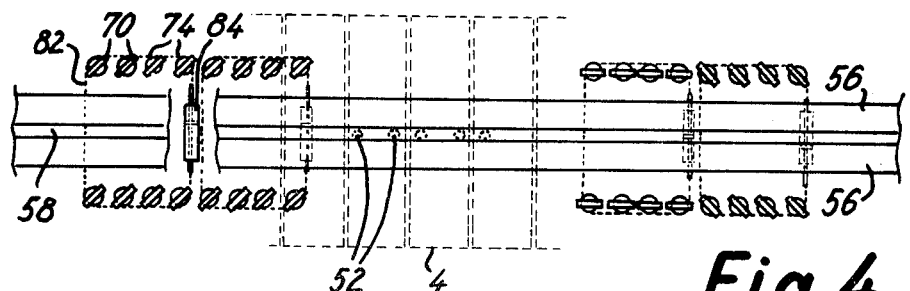
Figure 5:
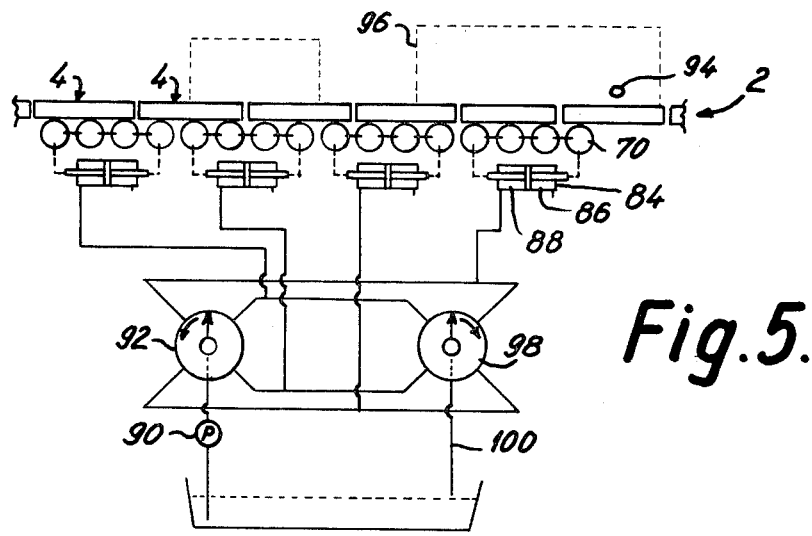

The invention is explained in more detail in the following reference being made to the accompanying drawing, in which:

FIG. 1 is a schematic perspective view of a section of a conveyor according to one embodiment of the invention;

FIG. 2 a schematic top view thereof;

FIG. 3 is a sectional view of a modified embodiment of the conveyor;

FIG. 4 a schematic top view of the supporting means for the upper run of the conveyor belt structure as used in FIG. 3; and FIG. 5 a schematic view of the actuator means used in the embodiment according to FIGS. 3 and 4.

The conveyor shown in FIGS. 1 and 2 generally comprises a conveyor belt structure and a stationary support or chassis 5 therefor. The belt structure 2 is made as an endless chain or train of conveyor elements 4 each comprising a rigid base body 6 provided with opposed end brackets 8 for rotatably holding a pair of rollers 10. Around the body 6 and the rollers 10 there is mounted an endless belt 12, which is in sliding engagement with the top and bottom surface of the body 6; in order to reduce the friction against movement of the belt 12 the said surfaces may be provided with grooves, small rollers or other suitable means. In order to reduce the weight of the bodies 6 these may be provided with cavities 14 or otherwise be built as lightweight constructions.

At the middle of the opposed ends of the bodies 6, as seen in the main direction of the conveyor 2 there is secured a plate 16 which is at 18 hinged to the adjoining plate 16 of the neighboring body 6 and connected to the opposite plate 16 of the same body by means of a link plate member 20, these members thus forming a regular chain and each carrying a body 6 with cross conveyor belt 12. The plate members 20 are each provided with a downwardly protruding pin 22 carrying at its lower end a horizontal roller 23 adapted to move in a stationary U-rail 24 so as to guide or hold the units 4 in a well defined lateral position. As indicated in the right hand side of FIG. 1 the hinges 18 allow the belt structure 2 to move in a convex path so as to enable it to pass end sprockets (not shown) or corresponding guiding means at the ends of the conveyor, as usual for endless conveyor belts having vertically spaced upper and lower runs. However, provisions may also be made to enable the belt 2 to move in a closed circuit in e.g. a horizontal adjacent the inner ends of the cross elements 4. FIG. 1 illustrated only a part of the upper run of the belt 2.

The belt structure 2, i.e. the single element 4 is supported by means of a plurality of rollers or wheels 26 mounted in brackets 28 which in their turn are carried on vertical shaft pins 30 rotatably secured to a base plate 32, and each provided with a radially projecting horizontal lever 34. The levers 34 belonging to the pins 30 placed in the same row across the plate 32 are interconnected by means of a cross rod 36 to which the outer lever ends are pivotally secured. Each of the rods are connected to a remotely controlled mechanism schematically shown as a double-acting cylinder at 38 for moving the rod 36 forwardly or rearwardly in its longitudinal direction to thereby cause a limited rotation of the shaft pins 30, and therewith a corresponding turning of the wheels or rollers 26 about their vertical axis. The elements 4 rest on the top of the wheels 26 directly with the lower side or length of the individual cross conveyor belts 12, and a well defined support is obtained due to the presence of the bodies 6.

It will be appreciated that the belt structure 2 driven in suitable manner by end sprockets or the like may be moved with small friction on the wheels 26 as long as these are orientated as shown in FIG. 1. The cross conveyor belts 12 will be moved in their own transverse direction only, i.e. without carrying out any movement of their own. Parcels or other articles may be fed to the belt structure 2 in any conventional manner and brought along therewith.

It is is desired to cause an unloading or diversion of a certain article from the conveyor at a given position therealong the mechanisms 38 for the wheels 26 adjacent this position are actuated manually or preferably automatically according to principles known per se — so as to turn the wheels to an inclined position relatively to the advancing direction of the belt structure 2, e.g. as indicated in FIG. 2. When the wheels 26 at a certain place are turned in this manner their frictional engagement with the lower run of the belt 12 will cause the lower run of the belt or belts 12 to move in transverse direction, and therewith the upper runs to move in the opposite direction, i.e. the article will be moved sideways off the conveyor into a receiving station, designated in FIG. 2.

As illustrated in FIG. 2 the control of the actuating mechanisms 38 may be effected in such a manner that the wheels 26 are at the entrance to the receiving station are turned less than the following wheels, so as to cause a suitably slow acceleration of the belts 12, whereby it is ensured that the articles resting on the belt or belts 12 will follow the transverse movement thereof in a well defined manner and thus also be delivered safely to the receiving station 40, even if the advancing velocity of the belt is relatively high. Preferably the turning of the wheels is carried out in a non-abrupt manner in order to obtain a correspondingly non-abrupt acceleration and deceleration of the belts 12.

Normally it should be ensured that sufficiently many sets of wheels 26 are actuated to cause the belt or the belts 12 to move a distance corresponding to the breadth of the belt structure 2, whereby it is made sure that also a small article resting on the belt 2 close to the edge opposite the receiving station 40 will be delivered to the station.

In the present connection it should be necessary to discuss in detail the manner or sequence in which the belts 12 are controlled or operated in order to cause the desired discharge at any desired place or places along the main conveyor; the operation and control in this respect can be almost exactly equivalent to the operation and control of e.g. the tiltable slat type as used for example in well known automatic sorter conveyors. It is sufficient to say that also here the control system may be adapted to actuate as many consecutive cross belts 12 as corresponding to the length of the article resting thereon, and that the belts 12 may be caused to move alternatively in one or the opposite direction.

FIG. 3 shows a sectional view of a preferred embodiment in which the conveyor elements 4 are provided with a pair of rollers 44 in addition to the end rollers 10. The element bodies 6 are constituted by cross walls outside the ends of the rollers 10 and 44, and an upper plate member 77 located between these walls. The cross belts 12, as shown are lifted up over the rollers 44 so that those rollers are in permanent driving connection with the belts 12 and are exposed in downward direction. Each element body 6 is secured to a lower plate member 46 extending across the underside of the element body between the said walls thereof and being rigidly secured to a conventional, continuous conveyor belt 48 of rubber or a similar material the connection is established by means of bolts 50 having a lower extension provided with a horizontal guiding roller 52. The conveyor chassis is designed 54 and carries at its top portion two longitudinal wooden beams 56 leaving between them a slot 58 in which the guiding rollers 52 move during operation of the conveyor. Thus, the rubber belt 48 will serve to hold the elements 4 in correct mutual positions, and at the same time serve as a hinge between neighboring elements instead of the hinge elements 16, 18, 20 shown in FIG. 1. The rubber belt 48 and therewith the entire upper run of the conveyor 2, i.e. all the upper elements 4 will be slidably supported on the wooden beams 56 in such a manner that normally no further support of the upper run is necessary; in practice the supporting surface of the beams 56 as well as the belt 48 are broader than shown in the drawing when compared with the breadth of the conveyor belt structure 2.

In the lower run of the conveyor the elements 4 may be supported in any convenient manner, e.g. by means of rollers 60. The upper run may alternatively be supported by means of stationary rollers 62 cooperating with the lower side of either of the rollers 10 or rigid beam elements 64 across the element bodies 6, as indicated in dotted lines in the left hand side of FIG. 3.

Also in the embodiment shown in FIG. 3 the cross belts 12 are adapted to be moved by means of angularly offset rollers situated underneath the upper run of the main conveyor 2 along each section thereof passing a receiving station. Since these rollers or wheels should not normally contribute to the support of the belt structure they may be arranged in a permanently offset position on a raisable support whereby it is sufficient to raise this support in order to start the cross movement of the belts 12, and to lower the support in order to stop this movement. An arrangement of this kind is shown in the left hand side of FIG. 3 in which the permanently offset wheel is designated 64, the said support 66, this support being common for a number of wheels 64, and cylinder means for raising and lowering the support 66 is designated 68. It will be appreciated that the wheels 64 may cooperate with the guiding rollers 44 so that they cause no wear on the cross belts 12. When the wheels 64 are permanently offset however, they are usable for moving the belts 12 in one direction only.

A simple arrangement enabling the belts 12 to be moved selectively in either direction is shown in the right hand side of FIG. 3 as well as in FIG. 4. The diversion rollers designated 70, are mounted on a turntable and raisable vertical shaft 72 underneath the path of the movement of the guiding rollers 44; to the shaft 72 there is secured a chain wheel 74 from the lower side of which there projects a tube piece 76 which rests in a longitudinal stationary rod member 78. In its lower edge the tube member 76 is provided with opposed notches 80 with which it rests on the rod 78 when the wheel 70 assumes the position shown in FIG. 3 in which the wheel plane is parallel to the main direction of the conveyor 2; in this position the top side of the wheel 70 is slightly spaced from the lower side of the rollers 44 which pass the wheel during operation of the conveyor.

As shown in FIG. 4 each group of e.g. eight diversion wheel structures 70 through 76 are provided with a round going chain 82 passing the chain wheels 74 in the manner shown. Control means such as cylinder means 84 schemtically indicated in dotted lines are mounted between the two rows of wheels 70, and connected to the chain 82, so as to be operable to displace the chain selectively in either direction sufficiently to cause the wheels 70 to be turned from their neutral position shown in FIG. 3 to a position in which they are offset approximately 45°. By this turning of the wheel structures the notches 80 will be turned away from their alignment with the rod 78, and it is readily understood that the wheel structures will hereby be raised irrespectively of the turning direction, so that the wheels 70 will engage rollers 44 in an operationally safe manner when they are moved into their active positions.

Though a detailed discussion of the operational features of the cross belts 12 is deemed unnecessary, because these features will not principally differ from the prior art, one example of a practical control system shall be described with reference to FIG. 5.

In FIG. 5 the main conveyor belt is shown at 2 as a continuous row of cross elements 4. The diverter wheels 70 are shown underneath the belt 2, and it is schematically indicated that they are coupled together four by four as shown in FIG. 4. Each of these groups are provided with a control cylinder 84, the piston of which may be pressed rearwardly in the cylinder against the action of an air spring in cylinder portion 86, when pressure liquid is supplied to the front portion 88 of the cylinder. The four groups of wheels 70 are situated along one receiving station adjacent the main conveyor. Operation pressure to the cylinder 84 is supplied from a pump 90 through a power driven rotary glider valve 92 to which the different cylinders are connected in sequence as illustrated in FIG. 5. At the entrance to the receiving station there is provided a stationary sensing device 94, such as a photocell arrangement capable of registering the passage of the front edge of an article 96, as well as the passage of the rear edge thereof. The main control system of the conveyor serves to make the sensing device 94 operative, when an article with the particular destination is under immediate approach to the receiving station. When the front edge of the article passes the sensing device 94 this device reacts so as to start the driving means for the glider valve 92 whereby, with a valve movement in direction of the arrow shown, pressure will first be supplied to the first cylinder 84, i.e. the first group of four wheels 70 will be actuated, whereafter the next cylinder 84 is correspondingly actuated, and so forth, i.e. the wheel groups immediately in front of the moving article will be consequetively operated so as to force the passing belts 12 to start moving, and thus the article to be diverted from the conveyor. As illustrated another rotary glide valve member 98 is mounted in parallel with the valve 92, and this valve 98 is operatively connected with the device 94 so as to be actuated in response to the rear end of the article passing the device. It will be noted that when the valve 98 has been started it will first connect the pressure room 88 of the first cylinder 84 to a return pipe 100 for the pressure fluid whereby the air spring 86 will be able to press the cylinder piston back to its initial position and thus return the wheels 70 to their inoperative positions. Thereafter, as the valve 98 continues its operation and completes a full revolution the following groups of wheels 70 will be consecutively reset to their neutral positions.

The operation speed of the valves 92 and 98 is so adapted that they complete their revolution during the time necessary for one conveyor element 4 to pass the receiving station, and each belt 12 is operated sufficiently long time to ensure that it is displaced the whole width of the conveyor 2.

Of course, the system shown in FIG. 5 can be modified and many different manners in order to obtain any desired operational characteristic of the system including the possibility of using an automatic control switch or separate system for obtaining deviation of the wheels to the other side. The sensing device 94 may be actuated according to exactly the same principles as used for actuating the divertor means of almost any known sorter conveyor in response to the particular article reaching the particular or preselected unloading position, irrespectively of whether the control system is of the central coding type, i.e. with means for setting a destination code of each article in a central code register, or of the direct code responsive type, i.e. where the diverter means - in case the sensing devices 94 - are selectively actuated by the passage of a code mark actuated to each single article or at least participating in the movement thereof.

Of course if the control system of a conveyor of the said central coding type is operating with high accuracy it may be possible to omit the sensing devices 94 and instead let the control system directly actuate the control valves 92 and 98.

When the diverter means are actuated and stopped consecutively before arrival of the edge of an article to be diverted respectively immediately leading after the passage of the rear edge thereof, it is obtained that articles for different destinations may follow each other relatively closely. However, in order to secure a safe operation the spacing between the articles should be at least the length of one conveyor element 4 as measured in the longitudinal direction of the belt structure 2.

In the above examples the diversion wheels 70 are driven by means of the frictional contact with the upper run of the main conveyor 2, but it will be understood that the wheels may well be driven by other means such as a special separate motor (not shown) in driving connection with the wheels 70 whereby the frictional wear will be reduced. Moreover the wheels may be avoided and substituted by a switch arrangement for an electric motor mounted in each of the elements 4 for directly driving one of the guiding rollers for the belt 12, such as a motor being shown in dotted lines at 45 in FIG. 3; this motor or these motors may be energized by means of sliding shoes 47 engaging a contact rail 49 on the conveyor chassis if control means (not shown) are provided for making a particular contact rail section operative in response to the articles to be diverted reaching the particular receiving station. Alternatively the belts 12 may be driven by means of a pulley connected through an angle gear to a cog wheel or another pulley cooperating with an elongated tooth or friction rack on the conveyor support; in FIG. 3 this rack may be represented by the rail 49. The actuator means in this case should be adapted to move the two parts into engagement with each other at the selected place e.g. by raising the rack portion to an active position or to otherwise cause the driving connection to the belt 12 to be established in response to appearance of the control signal of an article to be diverted at this place.

The diversion wheels 26 or 70 need not be situated underneath the elements 4, since they can be arranged at one side of the conveyor 2, so as to cooperate with the exterior part of one of the end rollers 10; in FIG. 2 is in dotted lines at 42 indicated such an arrangement in which one broad wheel or roller is mounted along the side of the belt 2 opposite the receiving station so as to be able to drive all the belts 2 passing this roller as long as the roller is held in rotating engagement with the belt side.

It will be understood that the transverse movements of the belts 12 may be used not only for diverting articles from the conveyor, but also for bringing articles onto the conveyor when these articles are fed to the conveyor from the side thereof.

I claim:

1. A sorting conveyor having a main conveyor operable to move forwardly in an article carrier run past at least two stationary discharge stations, said main conveyor comprising a plurality of juxtaposed links each constituted by a conveyor element having a cross-conveyor means mounted cross-wise of the moving direction of said conveyor element, movement control means operable to cause said cross-conveyor means to carry out a conveying movement being located adjacent said discharge stations and being selectively operable for effecting diversion of an article resting on said cross-conveyor means at a selected one of said discharge stations, said conveyor means of each pair of consective conveyor elements being operable to effectively support an article of a length greater than the width of the cross-conveyor means of each of said conveyor elements, length registering means being provided for resigtering the length of each article conveyed on said main conveyor belt, said movement control means being operatively connected with said length registering means so as to cause conveying movement of said cross-conveyor means of as many consecutive conveyor elements as occupied by an article to be diverted.

2. A conveyor according to claim 1, wherein each of said cross-conveyor means includes a cross-conveyor belt means mounted crosswise of the moving direction of said conveyor elements, and wherein said movement control means comprise wheels mounted underneath the conveyor elements on a chassis of the conveyor so as to be movable between an inactive position in which they allow the cross-conveyor belt means to pass, and an active position in which they are in operative engagement with the lower side of the cross-conveyor belt means with their axis of rotation forming an angle in a horizontal plane with the direction of movement of said cross-conveyor belt means.

3. A conveyor according to claim 2, wherein said movement control means comprises means for raising said wheels from an inactive position in which they are out of engagement with the cross-conveyor belt means to said active position.

4. A conveyor according to claim 2, wherein said wheels are mounting turnably so as to be swingable between an inactive position in which their axis of rotation is substantially perpendicular to the moving direction of said cross-conveyor belt means and said active position.

5. A conveyor according to claim 4, wherein said wheels are operatively connected with actuation means operable to turn said wheels into their active positions with their axis of rotation angularly off set selectively to either side of the cross direction of said cross-conveyor belt means.

6. A conveyor according to claim 2, wherein said wheels in their active positions are driven by frictional engagement with said cross-conveyor belt means, the wheels otherwise being non-driven.

7. A conveyor according to claim 1, wherein said movement control means comprises individual driving motors for driving said cross-conveyor means, said actuator means comprise means for operating said motor as a particular conveyor element or elements pass a selected receiving station.

8. A conveyor according to claim 7, wherein said motors are mechanical motors adapted to be actuated by engagement between a length of a chassis of said cross-conveyor means and a member mounted in connection with said cross-conveyor means.

9. A conveyor according to claim 7, wherein the motors are electrical motors connected to a current source through a contact rail means, the actuator means comprise switch means operable to make a selected partial length of said contact rail means operative.

10. A conveyor according to claim 1, wherein control means are provided for operating said actuator means in response to a leading edge of an article approaching a position in which the article is to be diverted and for rendering said actuator means inoperative in response to passage of a rear edge of the article.

11. A conveyor arrangement comprising a train of article carrier elements which are movable along a conveyor path past at least one discharge station accommodating at least two article carrier elements, each of said article carrier elements having a cross-conveyor means mounted cross-wise of the moving direction of said conveyor element, said cross-conveyor means having an article supporting surface which is operable to support an article resting on one or more consecutive cross-conveyor means, movement control means operable to cause said cross-conveyor means to carryout a conveying movement so as to be able to effect discharge of an article resting on the article supporting surface of said cross-conveyor means of a carrier element passing said discharge station, said movement control means including rotatable means located outside the space enclosed by the travel path of said cross-conveyor means and being operable to frictionally directly engage exterior outwardly facing surface portions of said cross-conveyor means and drive said cross-conveyor means in response to actuator means causing said rotatable means to rotate in a position thereof in which the frictional engagement of the outwardly facing surface portion of said cross-conveyor means is established and in which the rotatable means are oriented so as to transfer a driving force to said cross-conveyor means.

12. A conveyor according to claim 11, wherein the rotatable means of said movement control means includes a roller drivingly engaging exteriorly outwardly facing surface portions of said cross-conveyor means.

13. A conveyor according to claim 12, wherein said movement control means includes selectively operable driving control means for rotating said roller.

14. A conveyor according to claim 13, wherein said driving control means comprises a gear mounted on each article carrier element and a cog wheel operable to be driven by rolling along a toothed rack located at said discharge station.

15. A conveyor according to claim 13, wherein said driving control means comprises a gear mounted on each article carrier element and a pulley operable to be driven by rolling along a friction rack located at said discharge station.

16. A conveyor according to claim 13, wherein said driving control means comprises an electric motor mounted on each article carrier element and connected with sliding shoes operable to engage current rail means extending along the discharge station.

17. A conveyor comprising a train of article carrier elements which are movable along a conveyor path past at least one discharge station accommodating at least two article carrier elements, each of said article carrier elements having a cross-conveyor means mounted cross-wise of the moving direction of said conveyor elements, said cross-conveyor means having an article supporting surface which is operable to support an article resting on one or more consecutive cross-conveyor means, movement control means operable to cause said cross-conveyor means to carry out a conveying movement being located adjacent said discharge station so as to be able to effect a discharge of an article resting on said cross-conveyor means of a carrier element passing said discharge station, said movement control means including actuator means and driving means, said driving means being operable by said actuator means to drive said cross-conveyor means, said actuator means being operable to selectively actuate said driving means in such a manner that said driving means are operable to drive said cross-conveyor means of a selected carrier element during its passage of the discharge station while leaving undriven the cross-conveyor means of a non-selected carrier element which is immediately adjacent the selected element and which is present in the discharge station substantially concurrently with said selected element, and length registering means for registering the length of each article conveyed on said main conveyor belt, said movement control means being operatively connected with said length registering means so as to cause conveying movement of said cross-conveyor means of as many consecutive conveyor elements as occupied by an article to be diverted.

18. A conveyor according to claim 17, wherein said length registering means are disposed adjacent an entrance to the discharge station.

* * * * *